United States Patent
Sundarababu et al.

(10) Patent No.: US 10,277,700 B2
(45) Date of Patent: Apr. 30, 2019

(54) CONTROL PLANE REDUNDANCY SYSTEM

(71) Applicant: Dell Products L.P., Round Rock, TX (US)

(72) Inventors: Premnath Sundarababu, Chennai (IN); Purushothaman Ramalingam, Chennai (IN); Mahesh Manivasagam, Chennai (IN)

(73) Assignee: Dell Products L.P., Round Rock, TX (US)

( * ) Notice: Subject to any disclaimer, the term of this patent is extended or adjusted under 35 U.S.C. 154(b) by 442 days.

(21) Appl. No.: 15/097,022

(22) Filed: Apr. 12, 2016

(65) Prior Publication Data
US 2017/0295240 A1 Oct. 12, 2017

(51) Int. Cl.
*H04L 29/08* (2006.01)
*H04L 29/14* (2006.01)

(52) U.S. Cl.
CPC .............. *H04L 67/28* (2013.01); *H04L 69/40* (2013.01)

(58) Field of Classification Search
None
See application file for complete search history.

(56) References Cited

U.S. PATENT DOCUMENTS 7,076,555 B1 * 7/2006 Orman ................. G06F 11/203
709/223
2002/0174232 A1 * 11/2002 Kikuta ................. H04Q 11/04
709/227

* cited by examiner

Primary Examiner — Jeffrey R Swearingen
(74) Attorney, Agent, or Firm — Haynes and Boone, LLP

(57) ABSTRACT

A control plane redundancy system includes a control system that is configured to provide a plurality of control plane functionalities to a network, a primary networking device that is configured to establish a first communication connection with the control system, and a secondary networking device that is configured to establish a second communication connection with the primary networking device and a third communication connection with the control system. The primary networking device can transmit to the control system a secondary networking device identifier that identifies the secondary networking device as a redundant networking device for the primary networking device when the first communication connection is unavailable. The secondary networking device can determine that the primary networking device is still active when the first communication connection is unavailable and, in response, establish a proxy communication connection between the primary networking device and the control system.

20 Claims, 12 Drawing Sheets

CONTROL PLANE REDUNDANCY SYSTEM

BACKGROUND

The present disclosure relates generally to information handling systems, and more particularly to a control plane redundancy system used with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switches and other networking devices, are sometimes managed through an abstraction of the networks high-level functionality via software-defined networking (SDN) techniques. For example, in network topologies for SDN-based systems, each switch has a full data plane capability and a limited control plane capability, and the switches communicate with each other using a data plane protocol while communicating with a control system via a control plane using a control plane protocol. In the event the connection between a switch and the control system is lost, then both the switch and the control system will determine the other is no longer part of the network topology and both will cease communicating with the other. However, both the switch and the control system may remain active despite the lost connection, which can result in the switch being underutilized due to the control system believing the switch is no longer part of the network topology.

Accordingly, it would be desirable to provide a control plane redundancy system.

SUMMARY

According to one embodiment, an Information Handling System (IHS) includes a communication system; a processing system that is coupled to the communication system; and a memory system that is coupled to the processing system and that includes instructions that, when executed by the processing system, cause the processing system to provide a redundancy engine that is configured to: establish a first communication connection with a control system; establish a second communication connection with a networking device that includes a third communication connection with the control system; determine that the networking device is active when the third communication connection with the control system is unavailable and, in response, establish a proxy communication connection between the networking device and the control system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
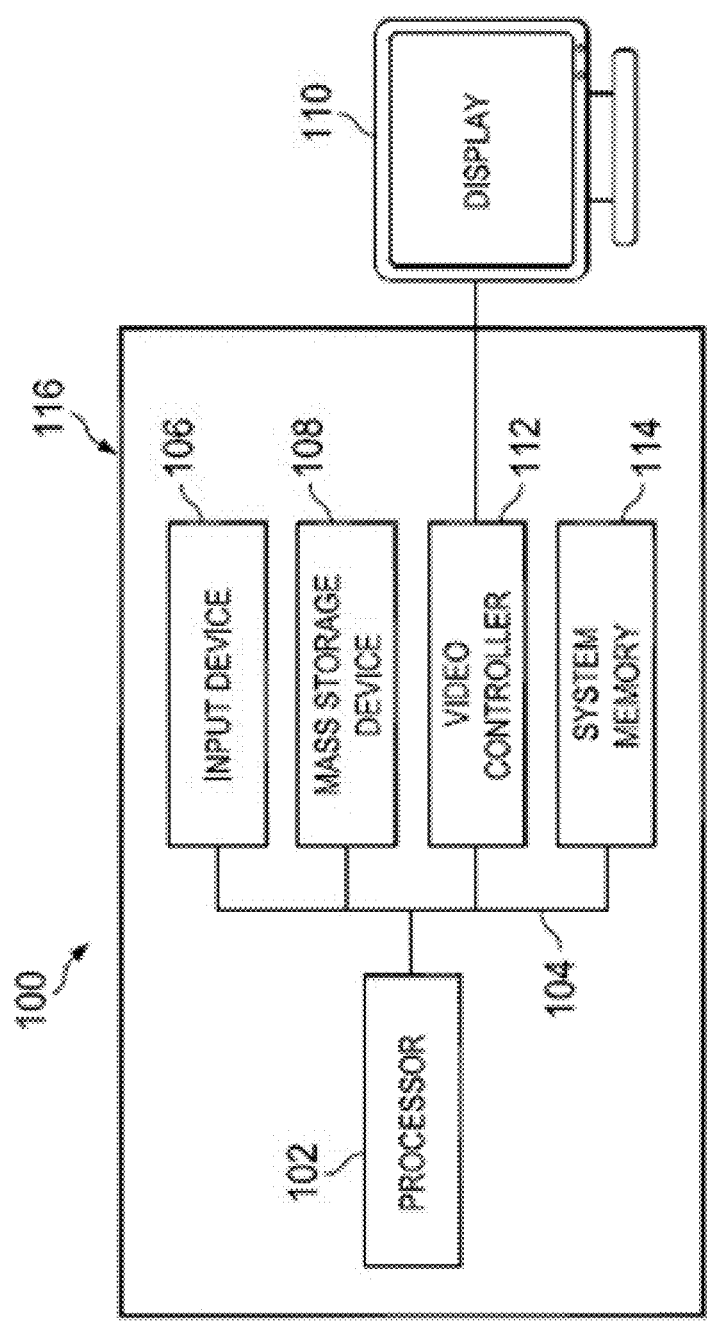
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
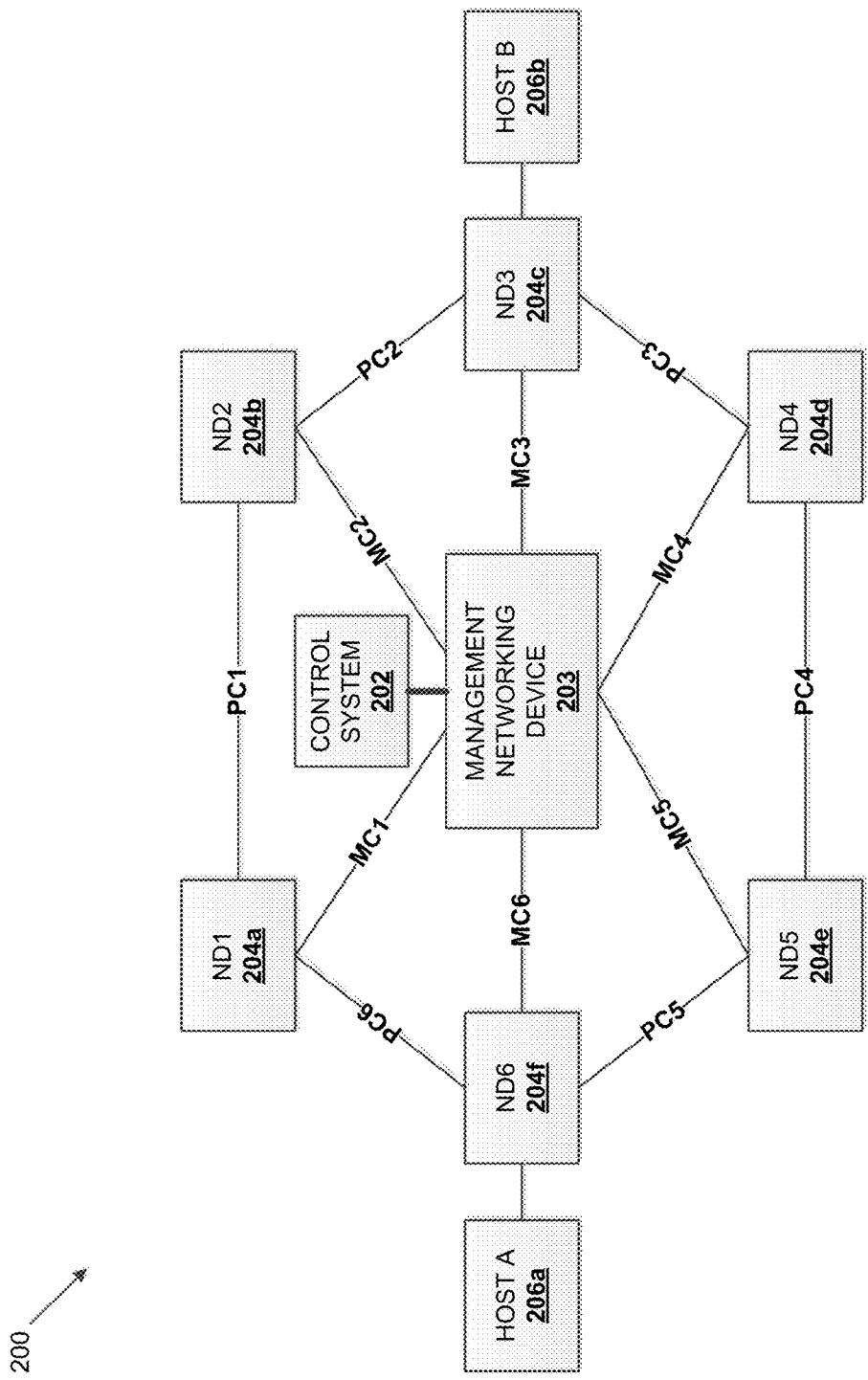
FIG. 2 is a schematic view illustrating an embodiment of a control plane redundancy system for a network topology.

Referring now to FIG. 2, an embodiment of a control plane redundancy system 200 is illustrated. In an embodiment, the control plane redundancy system 200 is provided by a network topology of a software-defined networking (SDN) system. The control plane redundancy system 200 includes a control system 202. In an embodiment, the control system 202 may be the IHS discussed above with reference to FIG. 1 and/or may include some or all of the components of the IHS 100. The control system 202 may be configured to provide interfacing capabilities between an application and a networking device, as well as a variety of other control system functionality known in the art. In a specific example, the control system 202 includes a control device providing an SDN controller on a control plane of an SDN system that interfaces between an application plane and a data plane of networking devices, and a management networking device 203 (e.g., a management switch) that allows the control device to communicate with networking devices, although other control system configurations are envisioned as falling within the scope of the present disclosure.

The control plane redundancy system 200 also includes a plurality of networking devices 204a-204f that may include switches, routers, hubs, gateways, bridges, repeaters, combinations thereof, and/or other networking devices known in the art. In an embodiment each networking device 204a-204f may be the IHS discussed above with reference to FIG. 1 and/or may include some or all of the components of the IHS 100. Each of the networking devices 204a-204f is communicatively coupled to the management networking devices 203 and control system 202 via a management communication connection (e.g., respective management communication connections MC1-MC6 for each of the networking devices 204a-204f). Furthermore, the plurality of networking devices 204a-204f are communicatively coupled to at least one of the other networking devices 204a-204f via a peer communication connection (e.g., peer communication connections PC1-PC6 between pairs of the networking devices 204a-204f). For example, the networking device 204a is communicatively coupled to the networking device 204b through the peer communication connection PC1 and the networking device 204f through peer communication connection PC6.

The control plane redundancy system 200 also includes a plurality of host devices (e.g., host devices 206a and 206b). In an embodiment the host devices 206a and 206b may be the IHS discussed above with reference to FIG. 1 and/or may include some or all of the components of the IHS 100. Each of the host devices 206 and 206b are communicatively coupled to one or more of the networking devices 204a-204f. For example, in the illustrated embodiment, the host device 206a is coupled to and in communication with the networking device 204f, and the host device 206b is coupled to and in communication with the networking device 204c. While a specific embodiment of a control plane redundancy system 200 has been illustrated and described, one of skill in the art in possession of the present disclosure will recognize that a wide variety of modification to the control plane redundancy system 200 will fall within the scope of the present disclosure, including combining components, modifying components, adding components, removing components, distributing components across multiple chassis, and the like.

Figure 3:
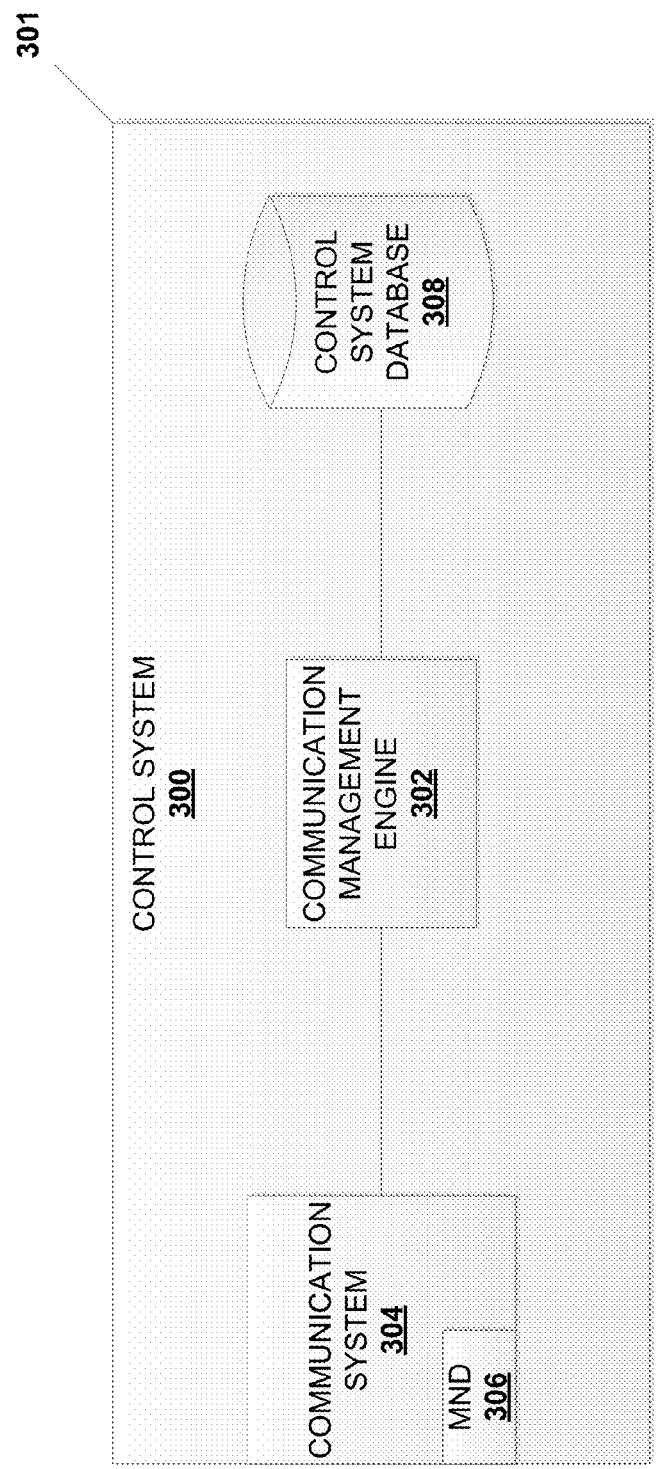
FIG. 3 is a schematic view illustrating an embodiment of a control system used in the control plane redundancy system of FIG. 2.

Referring now to FIG. 3, an embodiment of a control system 300 is illustrated that may be the control system 202 discussed above with reference to FIG. 2. As such, the control system 300 may be the IHS 100 discussed above with reference to FIG. 1 and/or may include some or all of the components of the IHS 100, and in specific embodiments may include one or more devices that include an SDN controller. The control system 300 includes at least one chassis 301 that houses the components of the control system 300, only some of which are illustrated in FIG. 3. For example, the chassis 301 may include a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a communication management engine 302 that is configured to perform the functions of the communication management engines and control systems discussed below including the generation of a proxy communication channel that is performed according to the method 600. The chassis 301 also houses a communication system 304 that is coupled to the communication management engine 302 (e.g., via a coupling between the communication management engine 302 and the processing system) and that may include a network interface controllers (NIC), a wireless communication device, and/or any other communication subsystem that provides for the communication connections between the control system 202/300 and the networking devices 204a-204f that allow for the communications discussed below. As discussed above, the communication system 304 may include or be coupled to a management networking device 306 (e.g., a management switch including a plurality of communication ports) that can establish the communication connections between the control system 202/300 and the networking devices 204a-204f. In an embodiment the management networking device 306 can be a standalone device and is communicatively coupled to the control system 300 via the communication system 304. The control system 300 also may include a storage device (not illustrated, but which may be the storage device 108 discussed above with reference to FIG. 1) that is coupled to the communication management engine 304 (e.g., via a coupling between the storage device and the processing system) and that includes a control system database 308 that is configured to store information about the networking devices 204a-202f as discussed in further detail below. While a specific embodiment of a control system 300 has been illustrated and described, one of skill in the art in possession of the present disclosure will recognize that a wide variety of modification to the control system 300 that allows the control system 300 to perform the functionality discussed below, as well as conventional functionality known in the art, will fall within the scope of the present disclosure.

Figure 4:
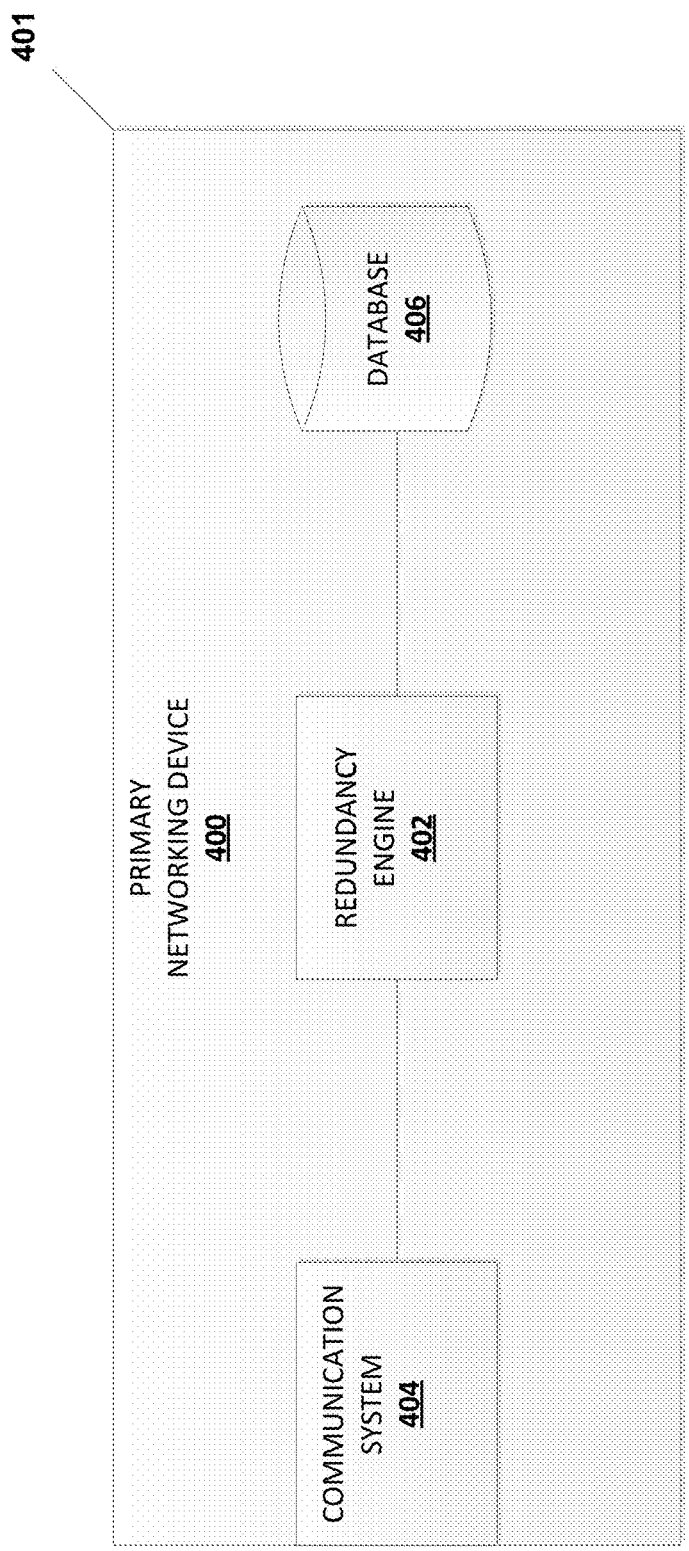
FIG. 4 is a schematic view illustrating an embodiment of a primary networking device used in the control plane redundancy system of FIG. 2.

Referring now to FIG. 4, an embodiment of a primary networking device 400 is illustrated that may be any of the networking devices 204a-204f discussed above with reference to FIG. 2. As such, the primary networking device 400 may be the IHS 100 discussed above with reference to FIG. 1 and/or may include some or all of the components of the IHS 100, and in specific embodiments may include switches, routers, and/or other networking devices known in the art. The primary networking device 400 includes a chassis 401 that houses the components of the primary networking device 400, only some of which are illustrated in FIG. 4. For example, the chassis 401 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a redundancy engine 402 that is configured to perform the functions of the redundancy engines and primary networking devices discussed below including indicating a secondary networking device to provide a proxy communication connection in the event a communication connection between the primary networking device 400 and the control system 300 is unavailable that is performed according to the method 600.

The chassis 401 may also house a communication system 404 that is coupled to the redundancy engine 402 (e.g., via a coupling between the communication system 404 and the processing system) and that may include a network interface controllers (NIC), a wireless communication device, and/or any other communication subsystem that provides for the communication connections between the control system 202/300 and/or the networking devices 204a-204f that allow for the communications discussed below. The communication system 404 may include a plurality of ports. As discussed below, a first subset of the plurality of ports may be dedicated for peer communication connections between the primary networking device 400 and peer networking devices, a second subset of the plurality of ports may be dedicated for management communication connections between the primary networking device 400 and the control system 300, and a third subset of the plurality of ports may be dedicated for proxy communication connections where the port is configured as a pass through for communications between the control system 300 and a peer networking device (e.g., any of the networking devices 204a-204f coupled to the networking device 400).

The chassis 401 also may house a storage device (not illustrated, but which may be the storage device 108 discussed above with reference to FIG. 1) that is coupled to the redundancy engine 402 (e.g., via a coupling between the storage device and the processing system) and that includes a networking device database 406 that is configured to store information about the networking devices 204a-202f and control system 202/300 as discussed in further detail below. While a specific embodiment of a primary networking device 400 has been illustrated and described, one of skill in the art in possession of the present disclosure will recognize that a wide variety of modification to the primary networking device 400 that allows the primary networking device 400 to perform the functionality discussed below, as well as conventional functionality known in the art, will fall within the scope of the present disclosure.

Figure 5:
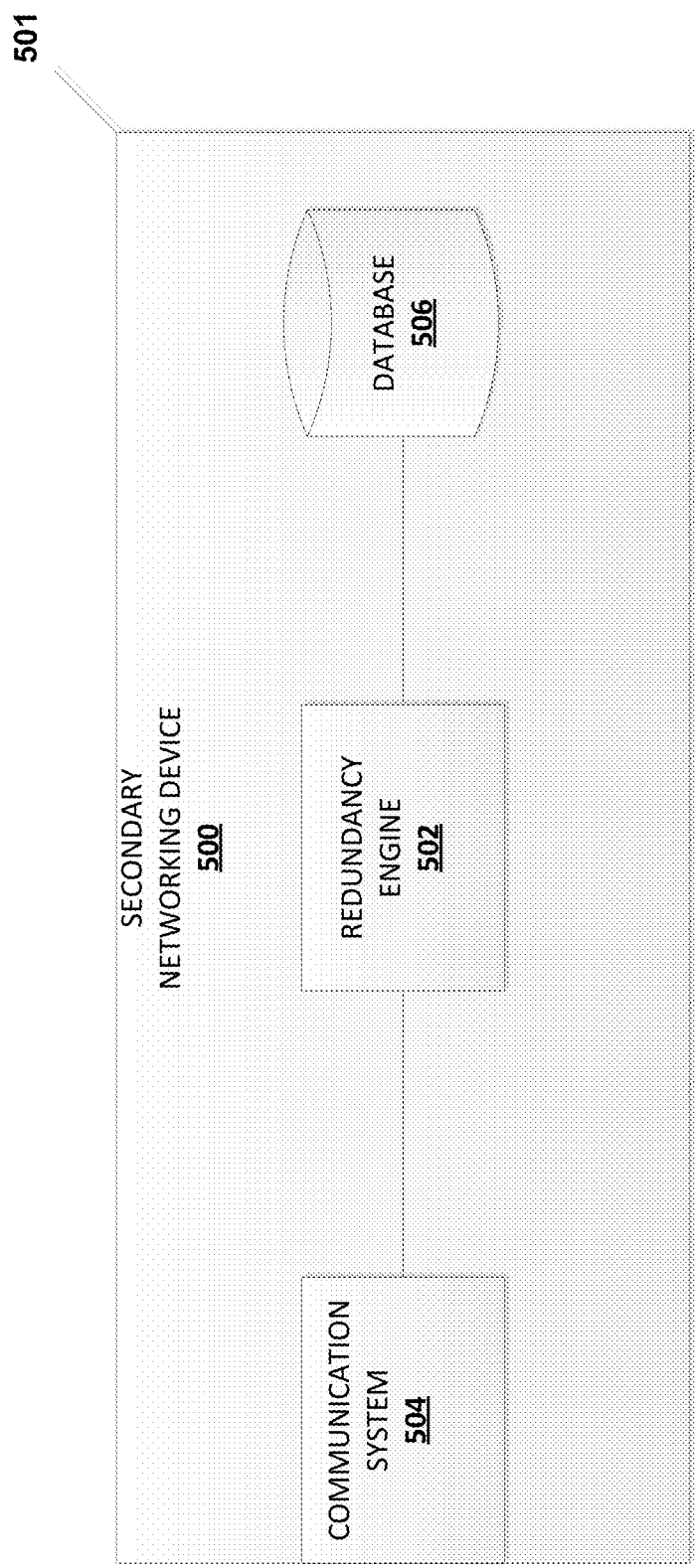
FIG. 5 is a schematic view illustrating an embodiment of a secondary networking device used in the control plane redundancy system of FIG. 2.

Referring now to FIG. 5, an embodiment of a secondary networking device 500 is illustrated that may be any of the networking devices 204a-204f discussed above with reference to FIG. 2. As such, the secondary networking device 500 may be the IHS 100 discussed above with reference to FIG. 1 and/or may include some or all of the components of the IHS 100, and in specific embodiments may include switches, routers, and/or other networking devices known in the art. The secondary networking device 500 includes a chassis 501 that houses the components of the secondary networking device 500, only some of which are illustrated in FIG. 5. For example, the chassis 501 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a redundancy engine 502 that is configured to perform the functions of the redundancy engines and secondary networking devices discussed below including establishing a proxy communication connection between the primary networking device 400 and the control system 300 that is performed according to the method 600.

The chassis 501 also houses a communication system 504 that is coupled to the redundancy engine 502 (e.g., via a coupling between the communication system 504 and the processing system) and that may include a network interface controllers (NIC), a wireless communication device, and/or any other communication subsystem that provides for the communication connections between the control system 202/300 and/or the networking devices 204a-204f that allow for the communications discussed below. The communication system 504 may include a plurality of ports. As discussed below, a first subset of the plurality of ports may be dedicated for peer communication connections between the secondary networking device 500 and peer networking devices, a second subset of the ports may be dedicated for management communication connections between the secondary networking device 500 and the control system 300, and a third subset of the ports can be dedicated for proxy communication connections where the port is configured as a pass through for communications between the control system 300 and the primary networking device 400.

The chassis 501 also may include a storage device (not illustrated, but which may be the storage device 108 discussed above with reference to FIG. 1) that is coupled to the redundancy engine 502 (e.g., via a coupling between the storage device and the processing system) and that includes a networking device database 506 that is configured to store information about the networking devices 204a-202f and control system 202/300 as discussed in further detail below. While a specific embodiment of a secondary networking device 500 has been illustrated and described, one of skill in the art in possession of the present disclosure will recognize that a wide variety of modification to the secondary networking device 500 that allows secondary networking device 500 to perform the functionality discussed below, as well as conventional functionality known in the art, will fall within the scope of the present disclosure. Furthermore, one of skill in the art in possession of the present disclosure will recognize that the primary networking device 400 and the secondary networking device 500 discussed above with reference to FIGS. 4 and 5 may be substantially similar such that each may perform the functions of the other (e.g., any networking device 204a-204f in the control plane redundancy system 200 may operate as a primary networking device or a secondary networking device in different embodiments.)

Figure 6:
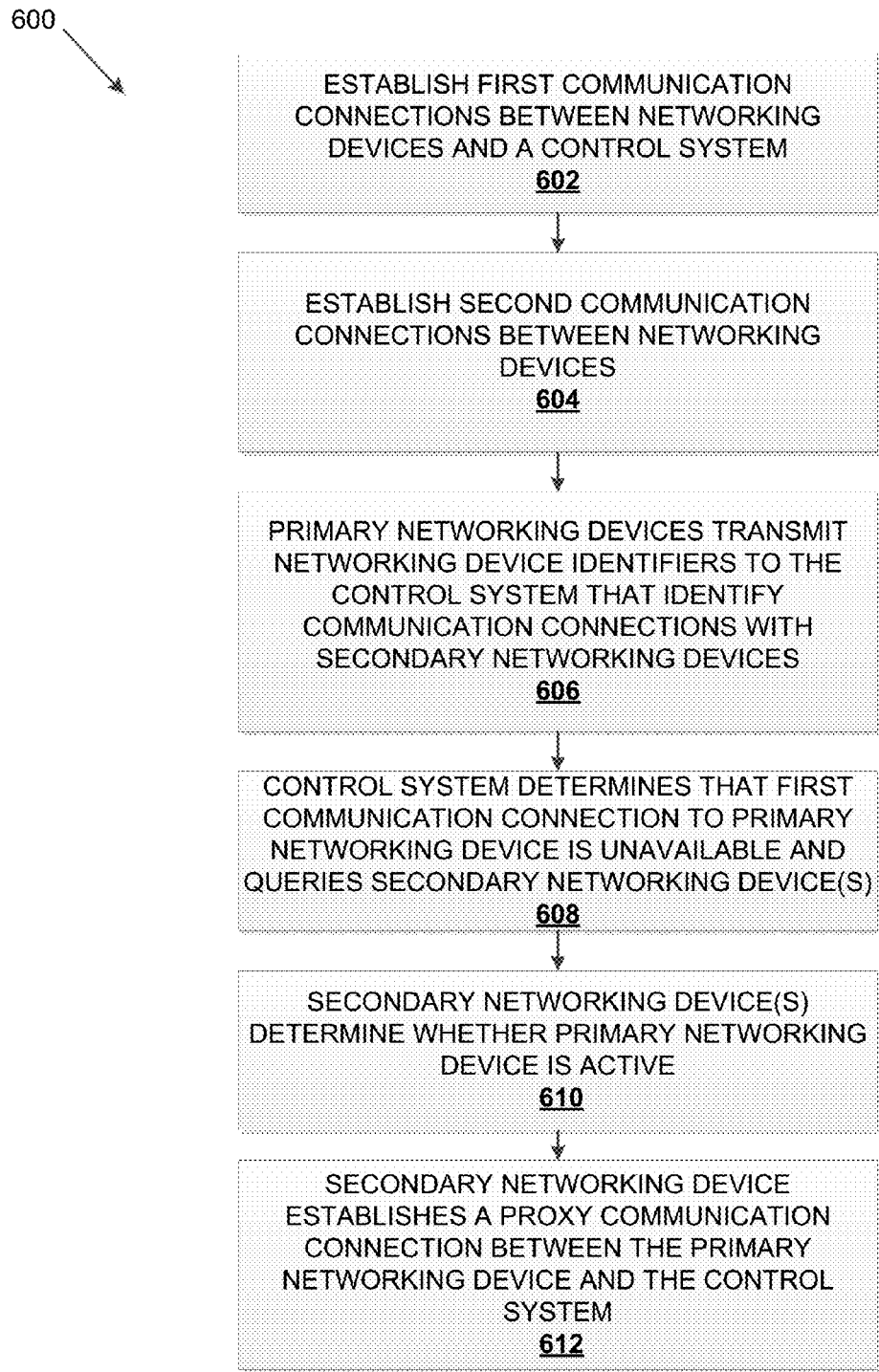
FIG. 6 is a flow chart illustrating an embodiment of a method for providing control plane redundancy.

Referring now to FIG. 6, an embodiment of a method 600 for providing control plane redundancy is illustrated. As discussed below, the systems and method of the present disclosure provide for communication connection failover in the event a management communication connection between a primary networking device and a control system is unavailable. Such communication connection failover is performed, in part, by the control system storing a network topology of a data plane that includes secondary networking devices that have a peer communication connection (e.g., data plane connection) with the primary networking device. When the management communication connection between the primary networking device and the control system is unavailable, the control system can send a status query command to the secondary networking device. The secondary networking device can then probe the primary networking device to determine whether the primary networking device is still active. If the primary networking device is still active, the secondary networking device can establish a proxy communication connection that provides a management communication connection for the control system and the primary networking device. As discussed below, such systems and methods enable the ability to provide an alternative management communication connection between the control system and the primary networking device via a secondary networking device when the initial management communication connection is lost. Loss of the management communication connection between the control system and the primary networking device results in the underutilization of the network due to the primary networking device and the control system recognizing each other as being inactive, and can prevent the control system from installing/configuring communication flows on the primary networking device even when the primary networking device is still active and part of the network topology, which. Thus, the systems and methods of the present disclosure provide for increased network uptime and network component utilization.

The method 600 begins at block 602 where first communication connections are established between networking devices and a control system. In the embodiments discussed in further detail below, "secondary networking device" is used to refer to a networking device that provides a proxy communication connection between the control system and a primary networking device, while "primary networking device" is used to refer to a networking device that has an unavailable management communication connection with the control system. As discussed above, each of the networking devices 204a-204f may be configured such that, during the method 600, that networking device operates as a primary networking device 400 and/or a secondary networking device 500. At block 602, a first communication connection may be established between each of the networking devices 204a-204f and the control system 202/300 via a management networking device 203. For example, at block 602 each respective management communication connection MC1-MC6 may be established between the networking devices 204a-204f and the control system 202/300 via a management networking device 203 via a variety of management communications between the control system 202/300 and each of the networking devices 204a-204f.

In a specific example, the control system 202/300 and the networking devices 204a-204f may be a part of a network configured with software-defined networking (SDN), and SDN techniques known in the art may be utilized to establish the management communication connections M1-M6. As such, the control system 202 can be configured in a control plane of the network, the networking devices 204a-204f can be configured in a data plane, and the control system 202 and networking devices 204a-204f can be configured to communicate with each other utilizing a communication protocol that provides access between the control plane and the data plane. Communication protocols that may be utilized to provide access between the control plane and the data plane may include the OpenFlow protocol, boarder gateway protocol (BGP), and/or other communication protocols known in the art.

Figure 7:
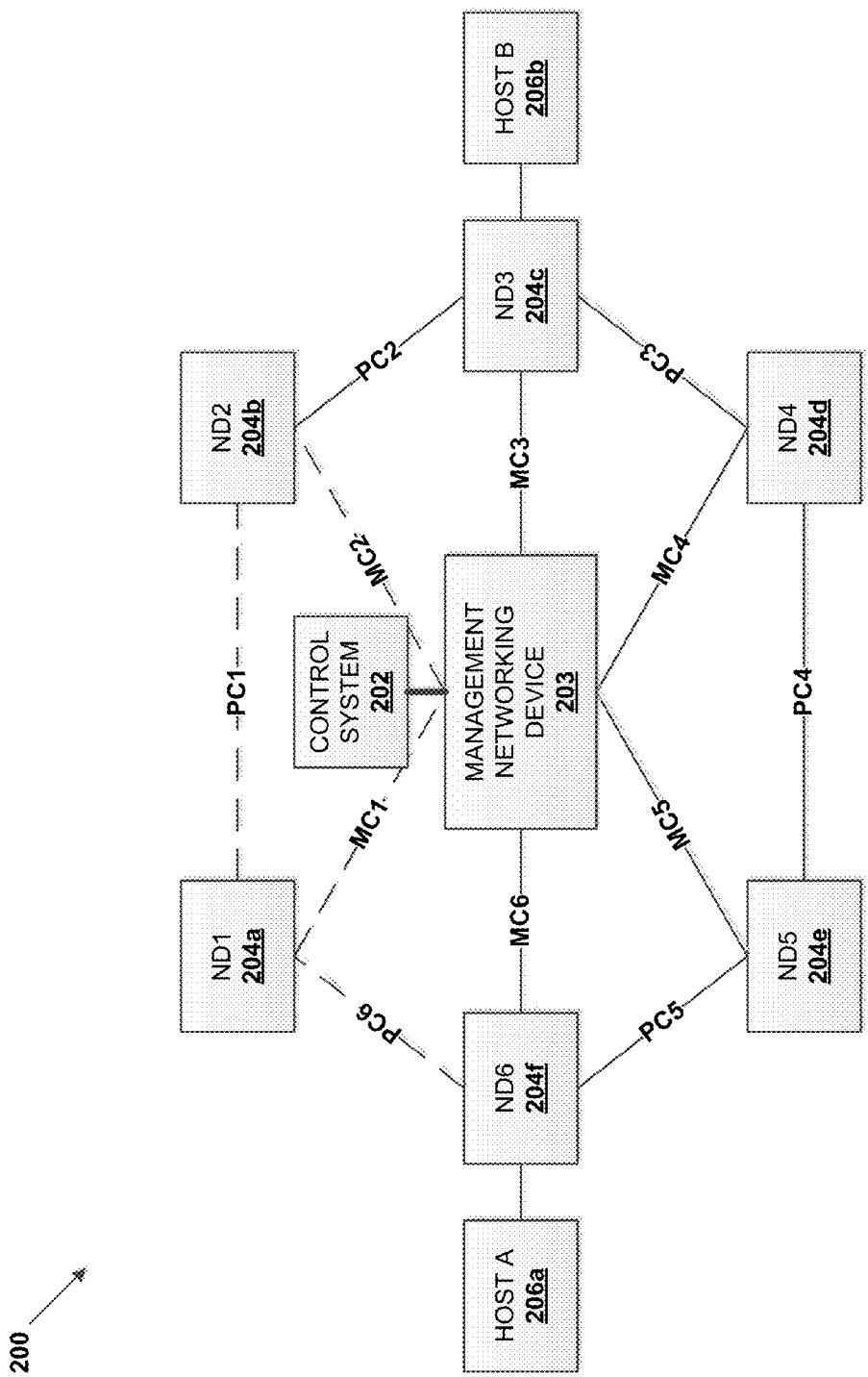
FIG. 7 is a schematic view illustrating an embodiment of communications in the control plane redundancy system of FIG. 2 when the primary networking device is added to the network topology.

Referring to FIG. 7, an embodiment is illustrated of the control plane redundancy system 200 with respect to method 600 at block 602 in which the networking device 204b (ND2) operates as a secondary networking device 204b (e.g., provided by the secondary networking device 500), the networking device 204a (ND1) operates as a primary networking device 204a (e.g., provided by the primary networking device 400), and the secondary networking device 204b may operate to provide a proxy peer communication connection for the primary networking device 204a in the examples discussed below. Furthermore, networking device 206f (ND6) operates as a secondary networking device 204b (e.g., provided by the secondary networking device 500) and may operate to provide a proxy peer communication connection for the primary networking device 204 in the example discussed below. As can be seen, the first communication connections (e.g., the management communication connections MC1, MC2, and MC6, respectively) are established between each of the networking devices 204a, 204b, and 204f and the control system 202/300 via the management networking device 203.

The method 600 then proceeds to block 604 where second communication connections are established between the networking devices. The second communication connections established between the networking devices are referred to below as a "peer communication connections." Each of the networking devices 204a-204f may establish peer communication connections (e.g., the peer communication connections PC1-PC6) with each another to provide the peer communication connections P1-P6 between neighboring networking devices. In an embodiment, when the control plane redundancy system 200 is a network configured with SDN, the networking devices 204a-204f may create the peer communication connections using a data plane communication protocol that may be different from the protocol used to create the management communication connections M1-M6. In an embodiment, such data plane communication protocols may include the link layer discovery protocol (LLDP) and/or a variety of other communication protocols known in the art. In an example, upon power up, any of the networking devices 204a-204f may discover its neighboring networking devices using LLDP and may then use subsequent communications to establish the associated peer communication connections with those networking devices.

Referring back to FIG. 7, the embodiment of the control plane redundancy system 200 illustrates how, at block 604, a peer communication connection PC1 has been established between the secondary networking device 204b and the primary networking device. Similarly, FIG. 7 illustrates how, at block 604, a peer communication connection PC6 has been established between the secondary networking device 204f and the primary networking device 204a.

The method 600 then proceeds to block 606 where primary networking devices transmit networking device identifiers to the control system that identify communication connections with secondary networking devices. As discussed below, any of the networking devices 204a-204f may operate as a primary networking device that may "nominate" neighboring networking devices that may provide secondary networking devices can act as proxy communication connection devices in the event the management connection between the primary networking device and the control system becomes unavailable. The networking device identifier may include an IP address, a MAC address, and/or any other device identifier known in the art. In an embodiment, when the primary networking device establishes a management communication connection with the control system 202/300, or in response to establishing a peer communication connection with a secondary networking device, the primary networking device may transmit one or more networking device identifiers that identify the secondary networking devices having peer communication connections with the primary networking device 400 via the communication system 404. As discussed below, the secondary networking devices identified by the networking device identifiers may subsequently be used to establish a proxy communication connection between the primary networking device and control system 202/300 in the event that the management communication connection between the primary networking device and control system 202/300 becomes unavailable.

In response to receiving first networking devices identifiers for secondary networking devices having peer communication connections with a primary networking device, the control system 202/300 may store those first networking device identifiers in association with a second networking device identifier for that primary networking device that transmitted the first networking device identifiers. For example, the control system 202/300 may store the networking device identifiers for secondary networking devices 204b and 204f that are reported by the primary networking device 204a in the control system database 308 in association with a networking device identifier of the primary networking device 204a. In an embodiment, the establishment of the communication connections at block 602 and the receiving and storing the networking device identifiers at block 606 provide the control system 202/300 with a topology of the networking devices in the data plane, and may allow the control system 202/300 to determine secondary networking devices that can establish a proxy communication connection for any primary networking device that has an unavailable management communication connection with the control system 202/300.

Figure 8:
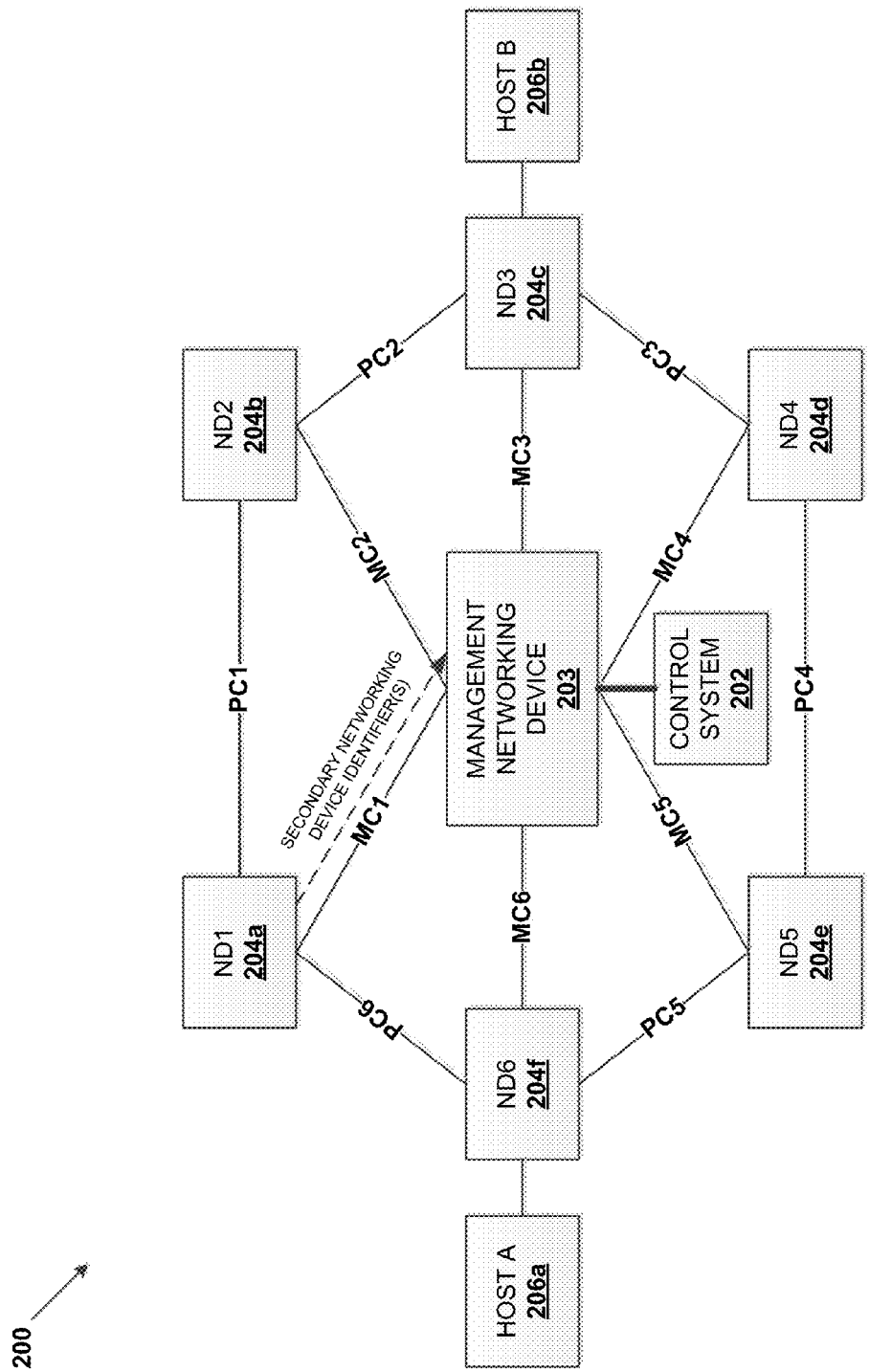
FIG. 8 is a schematic view illustrating an embodiment of communications in the control plane redundancy system of FIG. 2 when the primary networking device communicates secondary networking device data to the control system.

Referring to FIG. 8, an embodiment is illustrated of the control plane redundancy system 200 with respect to method 600 at block 606 in which the primary networking device transmits networking device identifiers to the control system 202 (via the management networking device 203 over management communication connection MC1) that identify the secondary networking devices 204b and 204f that have established respective peer communication connections PC1 and PC 6 with the primary networking device 204a. Similarly, the networking device 204b may act as a primary networking device and transmit networking device identifiers to the control system 202 (via the management networking device 203 over management communication connection MC2) that identify the networking devices 204a and 204c that act as secondary networking devices and that have established respective peer communication connections PC1 and PC2 with the networking device 204b. One of skill in the art in possession of the present disclosure will appreciate that any of the other networking devices 204c-204f may act as primary networking devices in the same manner as discussed above. As such, the control system 202 may store the networking device identifiers that identify any number of primary networking devices (e.g., each networking device 204a-204f in the system) along with the secondary networking devices that have peer communication connections with those primary networking devices.

Figure 9:
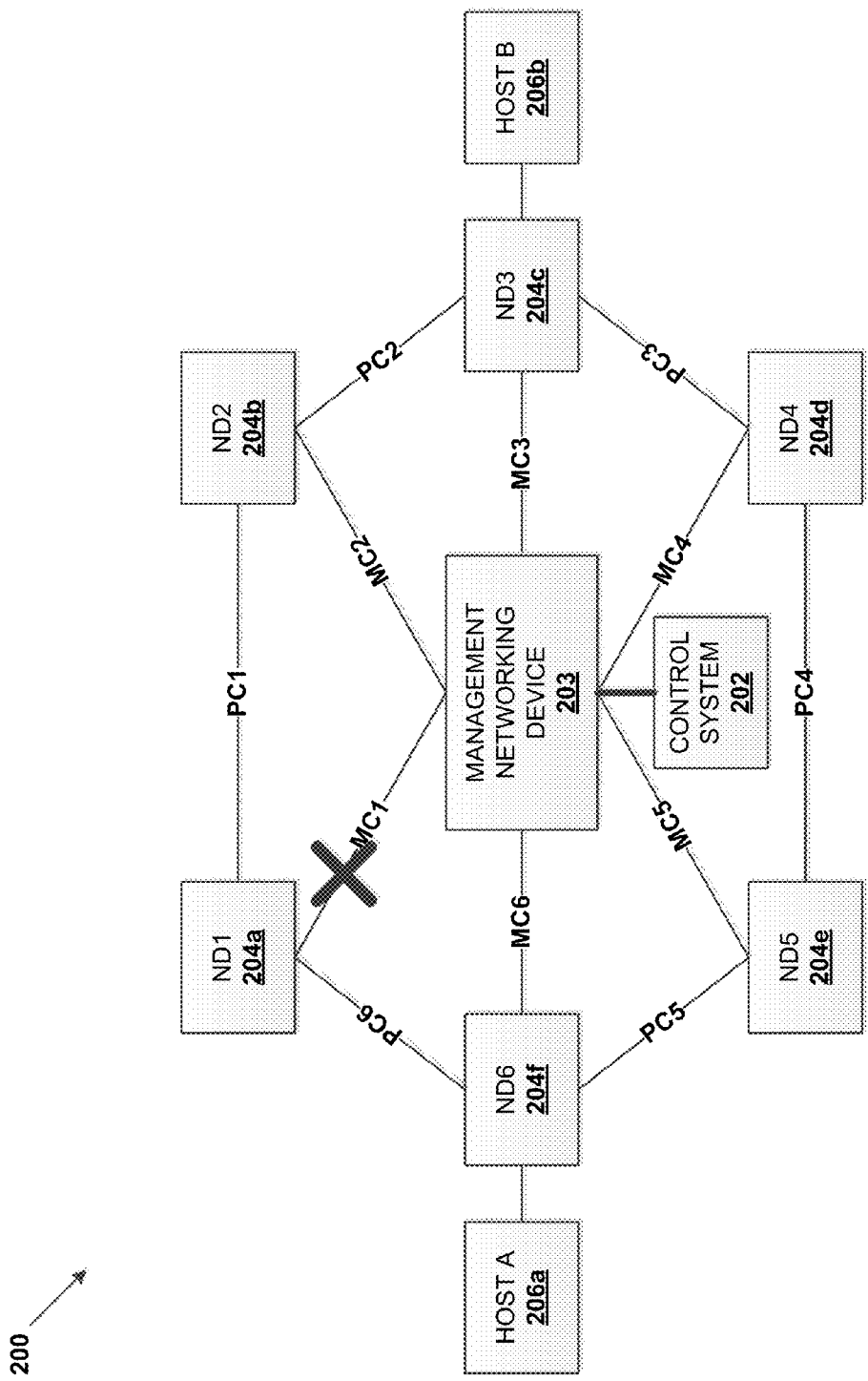
FIG. 9 is a schematic view illustrating an embodiment of the control plane redundancy system of FIG. 2 when the primary networking device loses connection with the control system.

The method 600 then proceeds to block 608 where the control system determines that the first communication connection to a primary networking device is unavailable and, in response, queries secondary networking devices about that primary networking device. FIG. 9 illustrates how, at block 608, the management communication connection MC1 between the primary networking device 204a and the control system 202 (e.g., via the management networking device 203) may become unavailable. In different examples, the management communication connection MC1 may become unavailable due to a port on the primary networking device 204a and/or the management networking device 203 going down or otherwise becoming unavailable, a physical connection between the primary networking device 204a and the management networking device 203 becoming faulty (e.g., faulty cables), other network issues in the management network, and/or in response to a variety of other unavailable communication connection scenarios that would be apparent to one of skill in the art in possession of the present disclosure. In an embodiment, the control system 202 may detect that the management communication connection MC1 with the primary networking device 204a has become unavailable in response to having not received a communication (e.g., a "keepalive" packet) from the primary networking device 204a for longer than some time period. However, other techniques for determining that a management communication connection to a primary networking device is unavailable are envisioned as falling within the scope of the present disclosure.

In response to determining that the management communication connection MC1 to the primary networking device 204a is unavailable, instead of making a determination that the primary networking device 204a is no longer part of the network as occurs in conventional systems, the control system 202 may reference the control system database 308 with the networking device identifier for the primary networking device 204a to retrieve the networking device identifiers for the secondary networking devices 204b and 204f that were previously associated with the networking device identifier for the primary networking device 204a in the control system database 308. As such, in response to determining that the management communication connection to a primary networking device is unavailable, the control system 202 may determine the secondary networking devices associated with that primary networking device.

Figure 10:
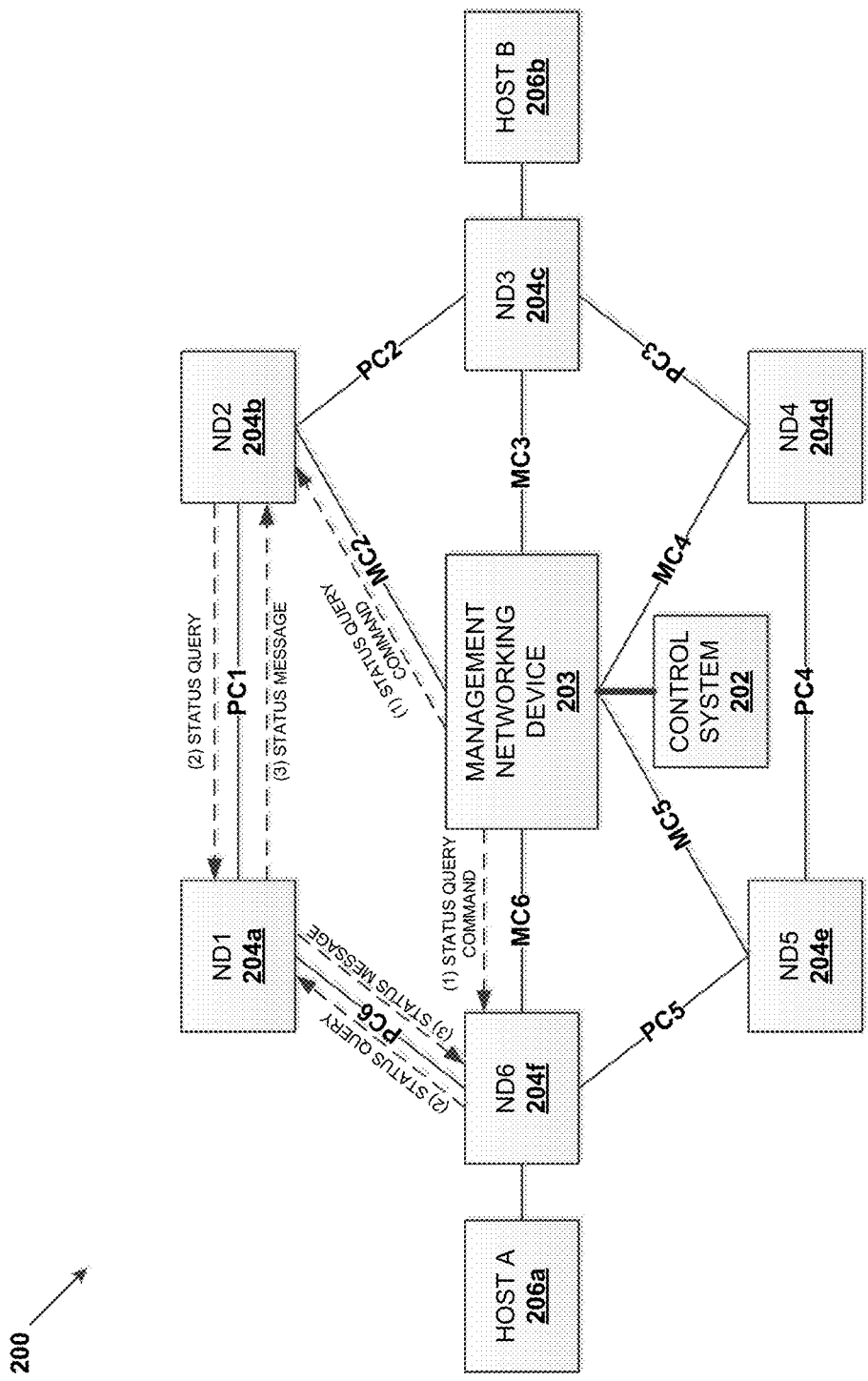
FIG. 10 is a schematic view illustrating an embodiment of communications in the control plane redundancy system of FIG. 2 to determine the status of the primary networking device.

For example, with reference to FIG. 10, in response to determining that the management communication connection MC1 to the primary networking device 204a is unavailable, the control system 202 may send a status query command to each of the secondary networking devices 204b and 204f through the management communication connections MC2 and MC6, respectively. In embodiments where more than one secondary networking devices are associated with a primary networking device that has become unavailable, the control system 202 may select a subset of the secondary networking devices associated with that primary networking device (e.g., a single secondary networking device) to which to transmit the status query command. For example, the control system 202 can select secondary networking devices to which to send the status query command based on relative communications or processing loads of the secondary networking devices, numbers of ports being utilized on the secondary networking devices, numbers of proxy communication connections provided by the secondary networking devices, the availability of management communication connections to those secondary networking devices, the capabilities of the secondary networking devices, and/or a variety other criteria that would be apparent to one of skill in the art in possession of the present disclosure. In an embodiment, the status query command may indicate that the management communication connection M1 between the control system 202 and the primary networking device 204a is no longer available and/or may instruct the secondary networking devices 204b and/or 204f to check the status of the primary networking device 204a. In a specific example, the status query command can include a CHECK_ALIVE message that includes a networking device identifier for the primary networking device that identifies the primary networking device as a device to be probed.

The method 600 then proceeds to block 610 where secondary networking device(s) determine whether the primary networking device is active. Referring back to FIG. 10, in response to receiving the status query command from the control system 202, the secondary networking device(s) 204b and/or 204f may transmit a status query (e.g., a probe) to the primary networking device 204a to determine whether the primary networking device 204a is available. In an embodiment, the status query may be provided in an LLDP message that may include protocol information such as, for example, a protocol type and protocol name provided in organization specific Type Length Value (TLV) fields in the LLDP message. For example, a status query may be transmitted by the secondary networking device(s) 204b and/or 204f through their respective peer communication connections PC1 and PC6 to the primary networking device 204a. Receipt of the status query may indicate to the primary networking device 204a that the control system 202/300 is still operating, and may cause the primary networking device 204a to transmit a status message back through the peer communication connections PC1 and PC6 to the secondary networking devices 204b and 204f that indicate an active status of the networking device 204a. In an embodiment, the status message may be provided in an LLDP message that may include protocol information such as, for example, a protocol type and protocol name provided in organization specific TLV fields in the LLDP message. As such, at block 610, the secondary networking devices for the primary networking device may receive a status query from the control system and send a probe to determine whether the primary networking device is operating, and may receive back a communication that indicates that the primary networking device is operating or is otherwise available. However, in embodiments where the secondary networking devices do not receive back any communication that indicates that the primary networking device is operating or is otherwise available following some time period after the sending of the probe, those secondary networking devices may inform the control system 202 (e.g., via their management communication connections) that the primary networking device is not operating or is otherwise unavailable.

The method 600 then proceeds to block 612 where a secondary networking device establishes a proxy communication connection between the primary networking device and the control system. In an embodiment, in response to determining that the primary networking device 204a is available, the secondary networking device 204b/500 may select at least one port on the communication system 504 to establish the proxy communication connection. For example, the networking device 204b may include a plurality ports that have been dedicated for proxy communication connections (e.g., the proxy communication connection may be configured to be established on a non-default port), and at block 612 the secondary networking device 204b may transmit a port identifier(s) for the at least one port that will provide the proxy communication connection between the control system 202/300 and the primary networking device 204a. For example, the port identifier(s) may be provided to the primary networking device 204a and the control system 202 in organization specific TLV fields of an LLDP message. The port identifier(s) may indicate a port(s) on the secondary networking device 204b that has been configured to run a proxy communication connection (e.g., a proxy OpenFlow process) between the primary networking device 204a and the control system 202. As such, each of the primary networking device 204a and the control system 202 may register or store the port identifier(s) received from the secondary networking device 204b for future communications with each other via the proxy communication connection.

In an embodiment, the proxy communication connection established by a secondary networking device may include a first proxy communication connection with the control system and a second proxy communication connection with the primary networking device using the at least one port identified as the proxy port as discussed above. Such first proxy communication connections and second proxy communication connections may include Transmission Control Protocol (TCP) communication connections, transport layer security (TLS), and/or other communication connections known in the art. In some embodiments, when more than one secondary networking device attempts to establish a proxy communication connection for the same primary networking device, the control system may allow the proxy communication connection that is established first to operate as the proxy communication connection, while informing the other secondary networking controller(s) that their proxy communication connections are not needed (and thus to remove them from their port(s)). In some embodiments, when multiple proxy communication connections to a primary networking device are available or established, the multiple proxy communication connections may be utilized for communication (e.g., teamed), while in other embodiment a single proxy communication connection that will be used may be selected from multiple available proxy communication connections based its associated secondary networking device characteristics (e.g., bandwidth, etc.) while the other proxy communication connections may be removed from their associated secondary networking devices. Following the establishment of the proxy communication connection, the secondary networking device may relay communications between the primary networking device and the control system via that proxy communication connection in order to enable management of the primary networking device by the control system, maintain control plane and data plane segregation, and/or provide other benefits that will be apparent to one of skill in the art in possession of the present disclosure.

Figure 11:
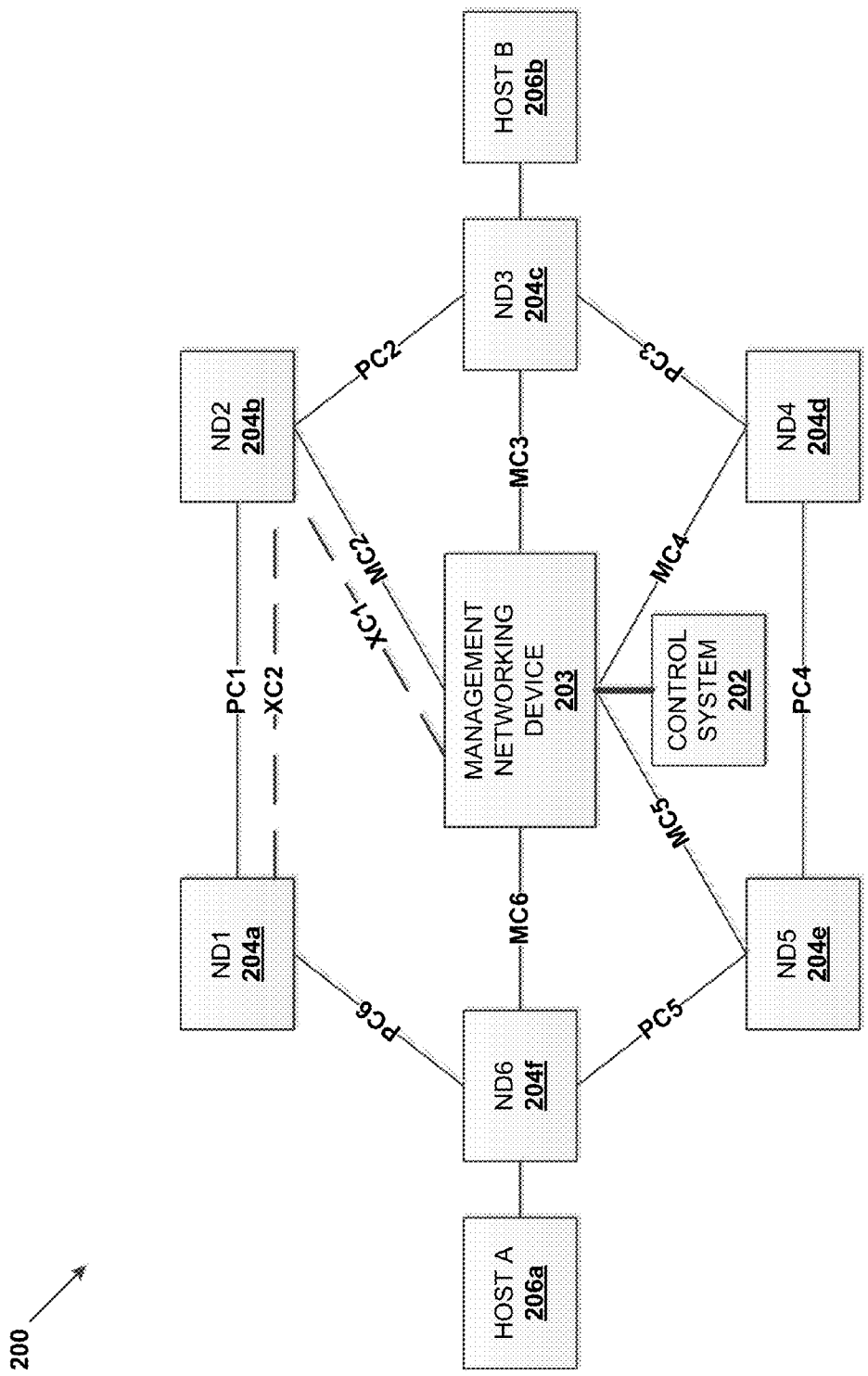
FIG. 11 is a schematic view illustrating an embodiment of control plane redundancy system of FIG. 2 after communication is reestablished between the primary networking device and the control system through the secondary networking device.

Referring to FIG. 11, an embodiment is illustrated of the control plane redundancy system 200 with respect to method 600 at block 612 in which the secondary networking device 204b has established a proxy communication connection between the primary networking device 204a and the control system 202. The proxy communication connection includes a first proxy communication connection XC1 from control system 202 to the secondary networking device 204b via the management networking device 203, and a second proxy communication connection XC2 from the secondary networking device 204b to the primary networking device 204a. In other embodiments, the secondary networking device 204f may establish a proxy communication connection between the primary networking device 204a and the control system 202 in place of, or in addition to, the proxy communication connection provided by the secondary networking device 204b. In an embodiment, the secondary networking device 204b may run two TCP connections on the proxy port, one to the primary networking device 204a and the other to the control system 202, and relay communications across both ends of that proxy port. The control system 202 and the primary networking device 204a may then simply send communications for each other to the proxy port on the networking device 204b.

Figure 12:
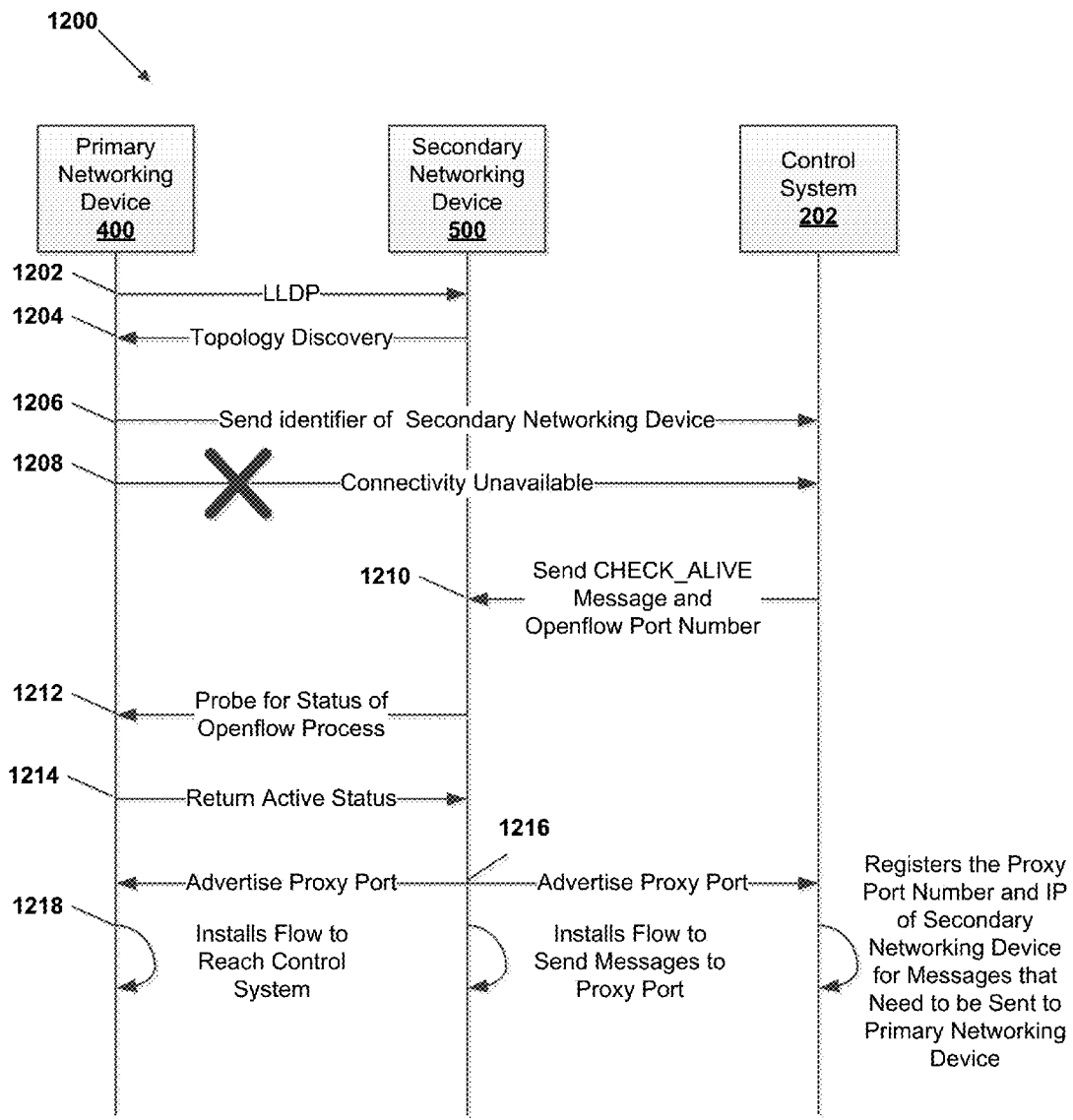
FIG. 12 is a communication sequence diagram illustrating an embodiment of control plane redundancy communications in the control plane redundancy system of FIG. 2.

Referring to FIG. 12, a communication sequence diagram 1200 of a specific example of control plane redundancy communications described above is illustrated. At step 1202, a primary networking device 400 sends an LLDP message to discover neighboring networking devices. A secondary networking device 500 can receive the LLDP message and respond to the primary networking device 400 at step 1204. The response can indicate topology of the network in that the primary networking device 400 has a peer communication connection with the secondary networking device 500. At step 1206 the primary networking device 400 can send an identifier of the secondary networking device 500 to the control system 202 so that the control system 202 can store the network topology of the networking devices. At step 208, the connectivity between the control system 202 and the primary networking device 400 can become unavailable. In step 1210, the control system 202 can transmit an OpenFlow CHECK_ALIVE message to the secondary networking device 500 based on the identifier of the secondary networking device 500 that was received by the control system at step 1206. At step 1212, the secondary networking device 500 can transmit an LLDP probe to the primary networking device 400 to determine status of the primary networking device 400. At step 1214, the primary networking device 400 may return an active status message to the secondary networking device 500. At step 1216, the secondary networking device 500 can advertise a proxy port on which the secondary networking device 500 can be established. At step 1218, the primary networking device 400 can install a flow to reach the control system 202. Furthermore, the secondary networking device 500 can install a flow to send messages to a proxy port on the secondary networking device 500. Also, the control system 202 can register the proxy port identifier and the IP address of the secondary networking device 500 or other identifiers for messages that need to be sent to the primary networking device 400.

Thus, systems and methods have been described that provide for communication connection failover in the event a management communication connection between a primary networking device and a control system becomes unavailable by establishing a proxy communication connection through a secondary networking device. The proxy communication connection enables the ability to provide an alternative management communication connection between the control system and the primary networking device, thus allowing for quick recovery of an unavailable management communication connection between the control system and the primary networking device so the control system can regain management control over the primary networking device to, for example, install/configure communication flows on the primary networking device via the proxy communication connection. Quick recovery of management communication connectivity can result in higher utilization of the network in that the primary networking device and the control system recognize each other as being active.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A control plane redundancy system, comprising:
a control system that is configured to provide a plurality of control plane functionalities to a network;
a primary networking device that is configured to establish a first communication connection with the control system; and
a secondary networking device that is configured to establish a second communication connection with the primary networking device and a third communication connection with the control system;
wherein the primary networking device is further configured to transmit to the control system a secondary networking device identifier that identifies the secondary networking device as a redundant networking device for the primary networking device when the first communication connection is unavailable; and
wherein the secondary networking device is further configured to determine that the primary networking device is still active when the first communication connection is unavailable and, in response, establish a proxy communication connection between the primary networking device and the control system.

2. The system of claim 1, wherein the secondary networking device is further configured to relay a packet between the primary networking device and the control system through the proxy communication connection.

3. The system of claim 1, wherein the secondary networking device is further configured to transmit to the control system a primary networking device identifier that identifies the primary networking device as a redundant networking device for the secondary networking device when the third communication connection is unavailable.

4. The system of claim 1, wherein the secondary networking device determining that the primary networking device is still active when the first communication connection is unavailable comprises:

receiving a status query command from the control system through the third communication connection that indicates that the first communication connection is unavailable, transmitting through the second communication connection a status query to the primary networking device, and receiving a status message from the primary networking device through the second communication connection that indicates an active status of the primary networking device.

5. The system of claim 1, wherein the secondary networking device establishing the proxy communication connection between the primary networking device and the control system comprises:

selecting a port on the secondary networking device to provide the proxy communication connection;

transmitting a port identifier for the port to the control system and the primary networking device; and establishing a fourth communication connection with the control system and a fifth communication connection with the primary networking device using the port.

6. The system of claim 5, wherein the secondary networking device is configured to relay messages transmitted between the control system and the primary networking device using the port.

7. The system of claim 1, wherein the control system is further configured to:

receive the secondary networking device identifier from the primary networking device;

determine that the first communication connection with the primary networking device is unavailable and, in response, transmit a status query command to the secondary networking device based on the secondary networking device identifier that identifies the secondary networking device as a redundant networking device for the primary networking device when the first communication connection is unavailable.

8. An Information Handling System (IHS), comprising:
a communication system;
a processing system that is coupled to the communication system; and
a memory system that is coupled to the processing system and that includes instructions that, when executed by the processing system, cause the processing system to provide a redundancy engine that is configured to:
establish a first communication connection with a control system;
establish a second communication connection with a networking device that includes a third communication connection with the control system;
determine that the networking device is active when the third communication connection with the control system is unavailable and, in response, establish a proxy communication connection between the networking device and the control system.

9. The IHS of claim 8, wherein the redundancy engine is further configured to relay a packet between the networking device and the control system through the proxy communication connection.

10. The IHS of claim 8, wherein the redundancy engine is further configured to transmit a networking device identifier for the networking device to the control system that identifies the networking device as a redundant networking device when the first communication connection is unavailable.

11. The IHS of claim 8, wherein the redundancy engine determining that the networking device is still active when the third communication connection is unavailable comprises:

receiving a status query command from the control system indicating the first communication connection is unavailable, transmitting through the second communication connection a status query to the networking device, and receiving a status message from the networking device through the second communication connection indicating an active status of the networking device.

12. The IHS of claim 8, wherein the redundancy engine establishing the proxy communication connection between the networking device and the control system comprises:

selecting a port on the communication system to provide the proxy communication connection;

transmitting a port identifier for the port to the control system and the networking device; and establishing a fourth communication connection with the control system and a fifth communication connection with the networking device using the port.

13. The IHS of claim 12, wherein the communication system is configured by the redundancy engine to relay packets between the control system and the networking device through the port.

14. The IHS of claim 8, wherein the redundancy engine is further configured to receive a status query from the networking device and, in response, transmit a status message to the networking device.

15. A method for providing control plane redundancy, comprising:

establishing, by a first networking device with a control system, a first communication connection;

establishing, by the first networking device with a second networking device, a second communication connection, wherein the second networking device includes a third communication connection with the control system;

determining, by the first networking device, that the second networking device is active when the third communication connection is unavailable and, in response, establishing a proxy communication connection between the second networking device and the control system.

16. The method of claim 15, further comprising:
relaying, by the first networking device through the proxy communication connection, a packet between the second networking device and the control system.

17. The method of claim 15, further comprising:
transmitting, by the first networking device to the control system, a second networking device identifier that identifies the second networking device as a redundant networking device of the first networking device when the first communication connection is unavailable.

18. The method of claim 15, wherein the determining that the second networking device is still active when the third communication connection is unavailable further comprises:

receiving, by the first networking device through the first communication connection from the control system, a status query command indicating the third communication connection is unavailable;

transmitting, by the first networking device through the second communication connection to the second networking device, a status query; and receiving, by the first networking device through the second communication connection from the second networking device, a status message indicating an active status of the second networking device.

19. The method of claim 15, wherein the establishing the proxy communication connection between the second networking device and the control system further comprises:
   selecting, by the first networking device, a port on the first networking device to run establish the proxy communication connection;
   transmitting, by the first networking device, a port identifier for the port to the control system and the second networking device; and
   establishing, by the first networking device, a fourth communication connection with the control system and a fifth communication connection with the second networking device using the port.

20. The method of claim 15, further comprising:
   receiving, by the first networking device through the second communication connection from the second networking device, a status query, and in response, transmitting, by the first networking device through the second communication connection to the second networking device, a status message indicating an active status of the first networking device.

\* \* \* \* \*